Nov. 13, 1934.　　　A. E. MICHENER　　　1,980,731
WEIGHING SCALE
Filed Aug. 27, 1931　　　5 Sheets-Sheet 1

Inventor
Arthur E. Michener
By William Janus

Nov. 13, 1934.  A. E. MICHENER  1,980,731
WEIGHING SCALE
Filed Aug. 27, 1931  5 Sheets-Sheet 5

*Inventor*
Arthur E. Michener
By William Janns, atty.

Patented Nov. 13, 1934

1,980,731

UNITED STATES PATENT OFFICE 1,980,731

WEIGHING SCALE

Arthur E. Michener, Bellevue, Ohio

Application August 27, 1931, Serial No. 559,621

35 Claims. (Cl. 265—56)

This invention relates to weighing scales, the object of the invention being the provision of a weighing scale having automatic tare take-up mechanism.

In weighing a commodity placed in a container, it is necessary first to ascertain the weight of the container and then to proceed with the weighing of the commodity after the weight of the tare or container is known. This requires two separate weighing operations, namely, of the container and then of the container and the commodity. It is also necessary to remember the weight of the container during the weighing of the commodity. This not only retards the weighing operation and increases the cost of packaging goods, but also permits errors to creep in since the operator is apt to err in reading the weight indications, or in remembering, or taking into consideration the weight of the tare during the weighing of the commodity. Where an expensive product is being packaged in a large quantity, even a fraction of an ounce overweight for each package constitutes a considerable item during the day's operation.

It is the primary object of the present invention to provide a weighing scale having tare mechanism which is automatically operated to counter-balance the commodity container so that the operator is not required to pay any attention to the container but can proceed with the weighing of the commodity in the usual manner.

Further objects of the invention are to provide a weighing scale having a counter-poise which is automatically movable relatively to the scale lever in accordance with the weight of the commodity container when the latter is placed on the load platform preliminary to the weighing operation whereby the balanced condition of the scale necessary for weighing the commodity is not disturbed by said container.

Still other objects of the invention are to provide a weighing scale having a lever, the commodity receiving end of which is provided with a supplementary lever system for supporting the commodity container and is operatively associated with a counter-poise which is automatically movable relatively to the fulcrum of the main lever so as to compensate for the weight of the container and restore the scale to balance condition.

Further objects of the invention are to provide a weighing scale having a main lever, a frame mounted on one end of said lever and adapted to receive a commodity container, said frame being movable in a vertical plane by the weight of said container, and to provide a counter-poise operatively associated with said frame and movable relatively to said lever in accordance with the weight of said container, whereby the weight of the container is automatically taken up or compensated for by said movable member and said scale remains in balance condition in readiness for the weighing of the commodity.

Additional objects of the invention are to provide automatically tare take-up mechanism which can be used in conjunction with any weighing scale which is entirely automatic in its action and which is of simple construction and accurate in operation.

With these and other objects in view, my invention consists in certain novel features of construction and arrangement of parts, hereinafter more fully described and claimed, and illustrated in the accompanying drawings, in which—

The invention as disclosed in the drawings is shown as being applied to a portable even balance scale having a base 10 on which is fulcrumed, by means of a support 11, a lever 12. As illustrated, this lever is substantially of rectangular shape having spaced side members 12$^a$ connected by end members 12$^b$. A downwardly presented knife edge member 14 extends transversely from each side member 12$^a$ and rests in the upwardly presented V-shaped groove formed in a block 15. These blocks are carried by the upwardly presented ends 16 of support 11 which is substantially U-shape and is fixed to said base transversely thereof.

Each side member 12ᵃ is provided near each end with an upwardly presented transversely projecting knife edge member 17. A commodity platter hanger 18 is supported from one end of lever 12 by means of the corresponding knife edge members 17 and a weight platter hanger 19 is supported in a similar manner from the other end of said lever. Each hanger is provided with a pair of arms 20, the ends of which carry bearing blocks 21 having downwardly presented V-shaped grooves which engage said knife edge members 17 and support said hangers pivotally in position.

Thus the lever 12 is fulcrumed by means of support 11 and each end of said lever has pivotally mounted thereon a hanger, one of which is adapted to support the commodity to be weighed and the container therefor while the other hanger receives the weight or load offsetting means.

Base 10 is formed of inverted box-shape and the top wall 10ᵃ thereof is provided with a central opening through which extends downwardly from support 11 a bar 22. This top wall is also provided near each end with an opening disposed below each hanger so that the rods 24 fixed to said hangers extend downwardly through said openings into said base.

A check link 25 is pivotally and stationarily mounted at 26 on the lower end of bar 22 and the ends of said check link are pivotally connected as at 27 to the lower ends of rods 24. Thus said check link, lever 12, and the hangers form a parallelogram which maintains said hangers at all times in proper positions.

A weight platform 28 is carried by hanger 19. That end of lever 12 adjacent to hanger 19 is provided with an extension or nose 29 which projects into the lower end of a housing 30. This housing or tower is supported by a bracket 31 fixed to base 10. The upper end of this housing is provided with an opening 32 through which is visible a weight indicating stationary chart 34 and a pointer 35. The chart 34 is stationarily mounted in said tower in any suitable manner and the pointer 35 is flexibly and operatively supported as at 36 within said tower and is connected by a link 37 to the nose or extension 29. Thus the movement of extension 29 in a vertical plane causes pointer 35 to move with respect to the chart.

The chart 34 is provided with a central zero mark and weight indicia marks arranged to each side of said zero mark. The indicia to one side of the zero are marked "under" and the other side "over" to indicate under and over weight. Thus when the indicator 35 points to zero, the scale is in balance and if the load placed on the commodity platter is over or under weight, the pointer 35 is disposed in the corresponding zone and indicates the exact amount in fractions of an ounce over or under weight.

The general construction and operation of the weight indicating means is substantially the same as that shown and described in United States Patent No. 1,405,634.

In order to facilitate the weighing operation and eliminate separate weighing operation of the container in which is placed the commodity that is to be weighed, I provide automatic tare take-up mechanism 38.

This mechanism is carried by the commodity hanger 18 and is operatively associated with lever 12 whereby the weight of the container actuates said mechanism and causes it to be operated relatively to said lever so as to compensate or balance the weight of said container and retain the lever in balanced condition.

The arms 20 of commodity platter hanger 18 are provided each with a forward extension 39 which extends toward the fulcrum of lever 12 and with a rear extension 40 which extends outwardly or rearwardly beyond the corresponding end of said lever. These extensions are preferably arranged outwardly of said members 12ᵃ and in the same plane with the ends of said arms and are disposed parallel with said side members 12ᵃ.

The ends of rear extensions 40 carry bearing blocks 41 having upwardly presented V-shaped grooves in which are supported downwardly presented knife edge members 42 of an auxiliary or tare lever 44. This lever is disposed above hanger 18 and preferably centrally thereof and extends forwardly or inwardly beyond said hanger.

Figure 4:
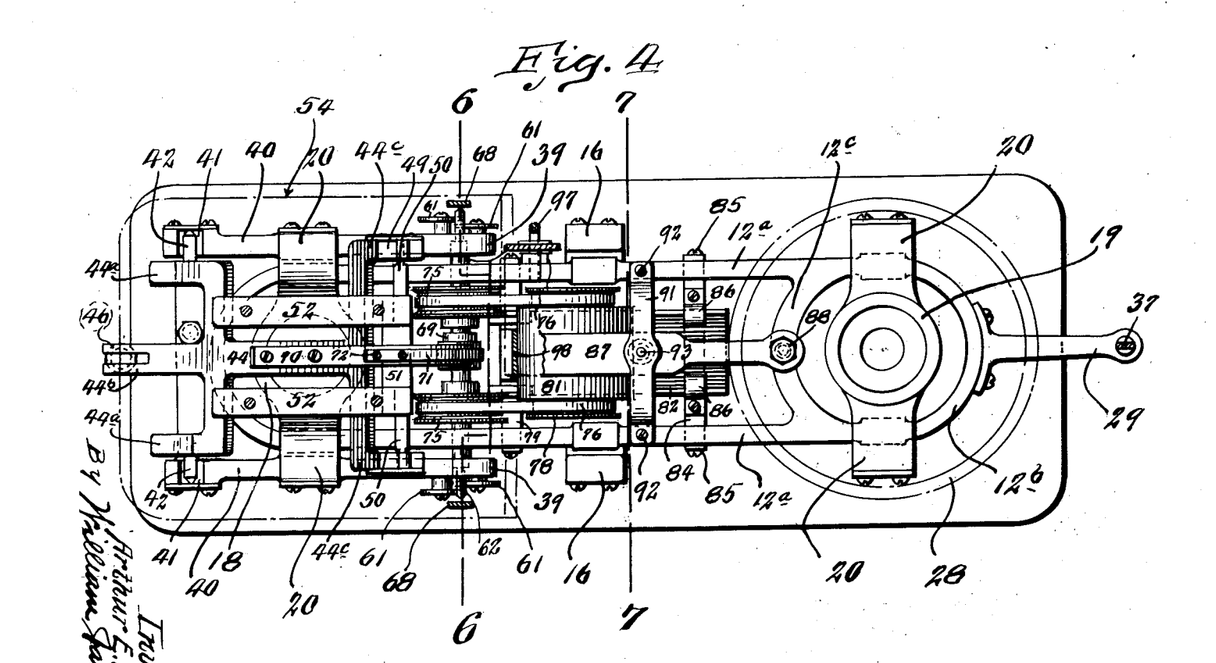
Figure 4 is a top plan view of same with the commodity and weight platters removed in order to illustrate more clearly the mechanism.

The knife edges 42 are preferably secured to transverse arms 44ᵃ, the latter being formed integral with said lever 44 and terminating adjacent to and inwardly of rear extensions 40, as shown in Figure 4.

Figure 1:
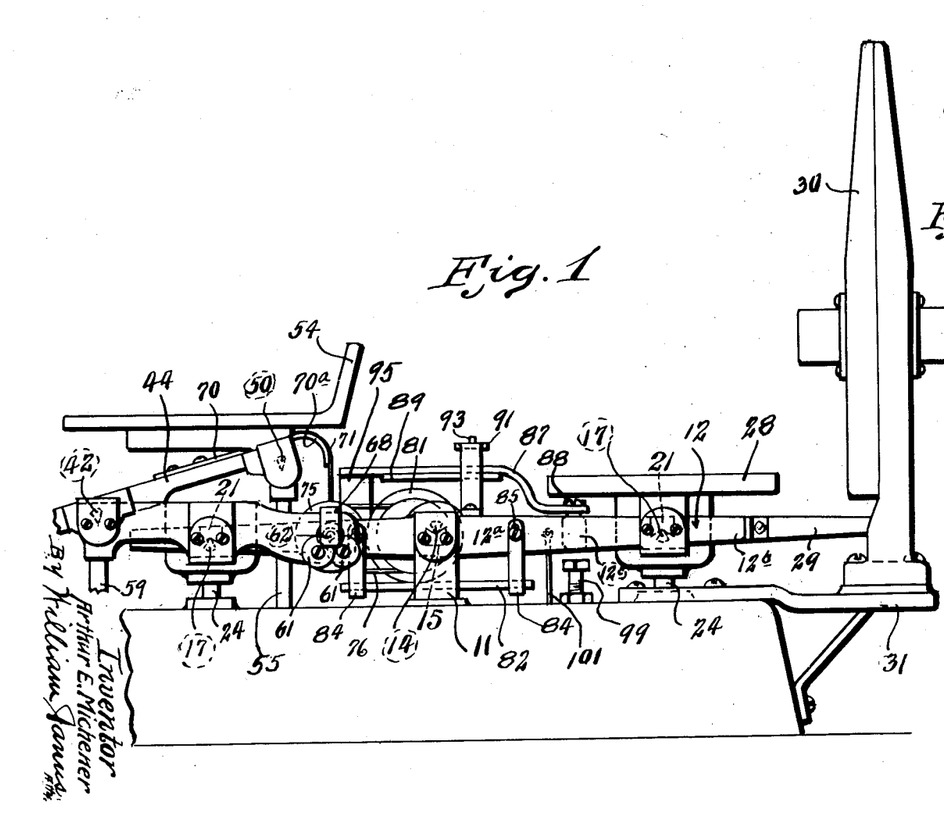
Figure 1 is a side elevational view of my improved scale.
Figure 2:
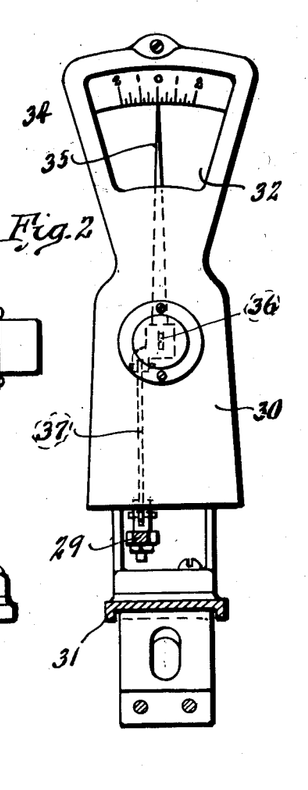
Figure 2 is a front elevational view of the indicating means.
Figures 3, 8, 9:
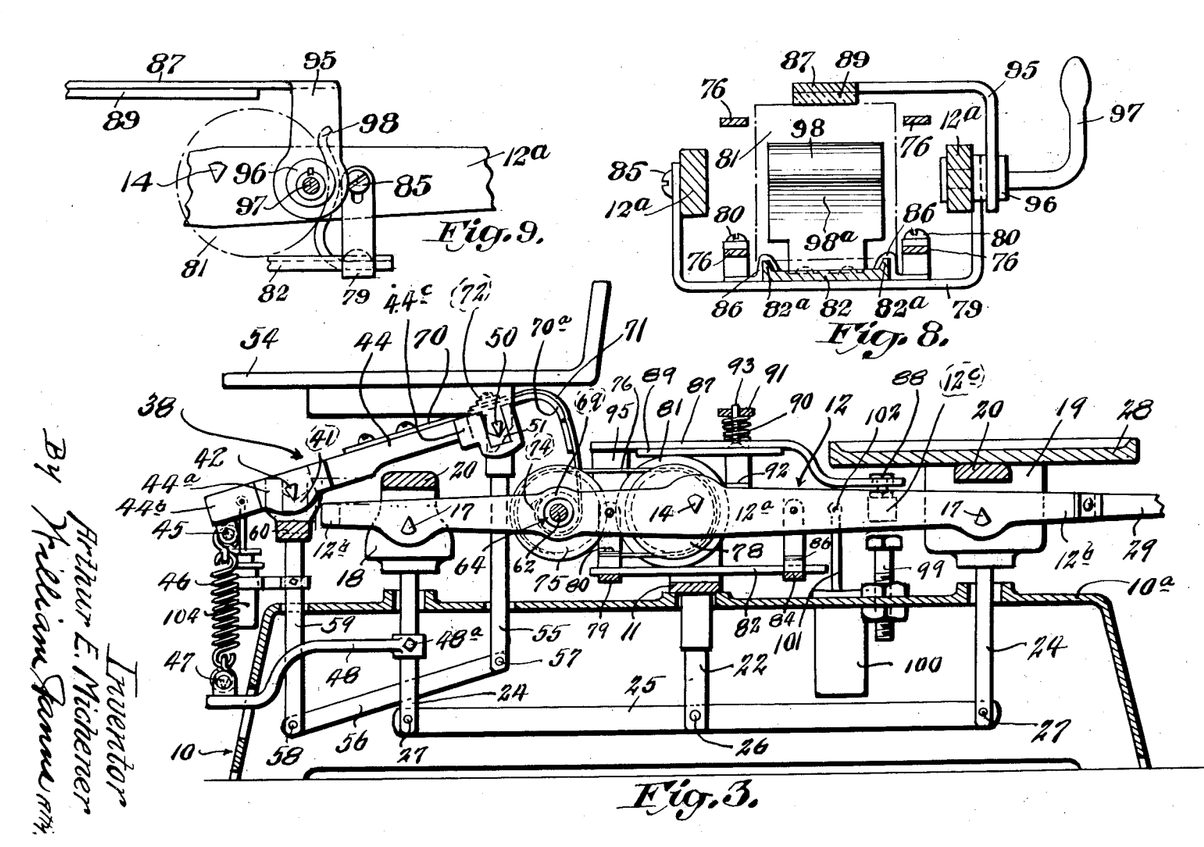
Figure 3 is a side elevational view, partly in cross section, of the scale and showing the lever mechanism in balanced position with the tare take-up mechanism in normal or zero position.
Figure 8 is a vertical cross section taken on line 8—8 of Figure 5.
Figure 9 is a fragmental elevational view.

The rear or outer end 44ᵇ of said lever 44 extends a suitable distance beyond the fulcrums or knife edge members 42 and has connected thereto, as indicated at 45, the upper end of a coiled spring 46, the lower end of which is connected at 47 to the outer end of an arm 48. This arm is fixed to rod 24 of hanger 18 within base 10 and extends outwardly from the latter through an opening formed in one of the end walls of said base, as shown in Figure 3.

The tension of this spring tends to hold the tare lever in raised position and allows the depression of said lever in accordance with the weight of the tare or commodity container placed on the scale. The spring being associated at one end with the hanger below the fulcrum thereof and at the other end with the tare lever which in turn is supported by the rear extension of said hanger, said spring is not affected and does not affect the operation of the lever 12.

The forward or inner end of lever 44 terminates in bifurcated or transversely spaced end portions 44ᶜ, each of which is disposed above the corresponding forward extension 39 of hanger 18. A bearing block 49 having an upwardly presented V-shaped groove is fixed to each end 44ᶜ and supported in each block is the downwardly presented knife edge member 50 of an auxiliary hanger 51. The upper end of this hanger extends above the tare lever 44 and is provided with two spaced rearwardly and outwardly extending arms 52 on which is secured a commodity platter 54.

Hanger 51 has fixed thereto a rod 55 which extends downwardly into base 10 through an opening formed in the wall 10ᵃ thereof. A check link 56 is pivotally connected at one end to the lower end of said rod as indicated at 57 and at the other end is pivotally connected, as indicated at 58, to the lower end of a vertically disposed rod 59. The latter is adjustably secured to a cross member 60 which is formed integral with and extends between the rear or outer extensions 40 of hanger 18. This rod 59 extends into the base through an opening formed in the top wall thereof.

This arrangement forms a parallelogram which maintains the auxiliary hanger 51 in proper position and maintains the knife edge members 50 at all times in proper operative positions in their bearings.

When a commodity container is placed on the platter 54, tare lever 44 is depressed in accordance with the weight of the container and against the influence of the coiled spring 46. As soon as the container is removed from platter 54 said spring restores the tare lever 44 and parts associated therewith to their normal zero positions.

The forward extensions 39 of arms 20 extend inwardly past hanger 51 and each end of said extension has revolubly mounted thereon a pair of disks 61 which are disposed with their axis in substantially the same horizontal plane. The disks of each pair are spaced transversely of each other and are arranged with their axis sufficiently close together to overlap and form anti-friction bearings for a shaft 62.

The latter extends transversely between said members 12a and outwardly therethrough through suitable openings 64 formed in said side members. These openings are sufficiently large to allow relative movement of lever 12 and shaft 62 without any interference.

Where the disks 61 are located on the outside of extensions 39, the ends 62a of said shaft extend outwardly through openings 65 formed in said extensions.

Each extension 39 is provided with an angle 63 the vertical end of which is disposed adjacent to and spaced from the respective end 62a and serves to limit the longitudinal movement of said shaft
62. A screw 66 is screw-seated in the horizontal portion of angle 63 and extends downwardly a suitable distance so as to limit the upward movement of the end 62a of said shaft. In this manner the shaft is held against displacement without being in contact with said parts and as said shaft is supported in position by anti-friction bearings or disks 61, said shaft is free to rotate with minimum friction.

As stated before, the shaft 62 extends transversely between side members 12a and is disposed in spaced relation with tare lever 44. A small pulley 69 is fixed on said shaft. A bar 70 is fixed to lever 44 and extends longitudinally therefrom and has its projecting end disposed above said pulley and curved downwardly as indicated at 70a. A flexible connection, such as a steel tape 71, is fixed at one end to bar 70, as indicated at 72, and extends downwardly over said curved end 70a and over said pulley 69 and has its other end fixed to the latter, as indicated at 74.

Figure 5:
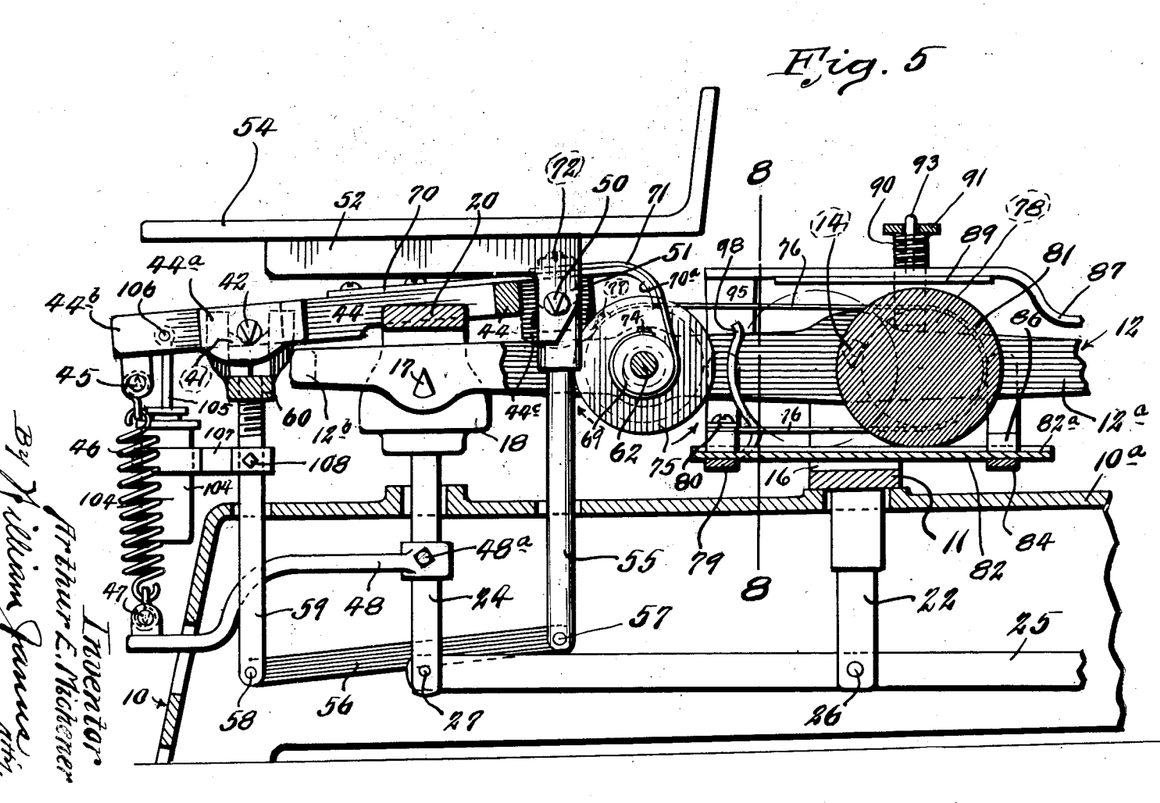
Figure 5 is an enlarged vertical cross section taken through the commodity end of the scale and showing the tare take-up mechanism in moved or actuated position.
Figure 6:
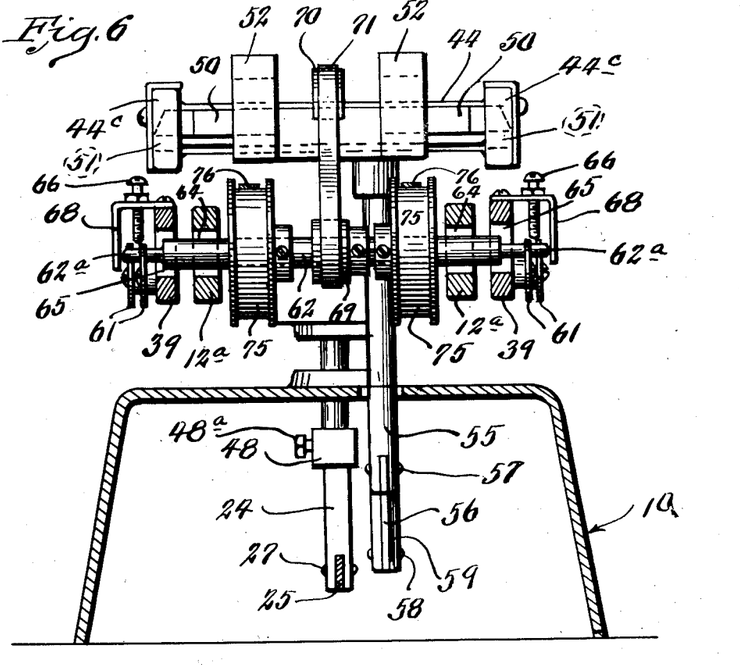
Figure 6 is a vertical cross section taken on line 6—6 of Figure 4.

Thus when lever 44 is depressed, as, for instance, under the weight of a container placed on platter 54 the bar 70 is also moved downwardly, allowing tape 71 to be wound on said pulley in a direction indicated by dotted arrow in Figure 5. When said container is removed, lever 44, by virtue of spring 46, is moved upwardly, moving bar 70 with it and thereby causing unwinding of tape 71, thus imparting to pulley 69 and shaft 62 revoluble motion in a direction indicated by solid arrow in Figure 5.

A sheave or comparatively large flanged pulley 75 is fixed on shaft 62 on each side of pulley 69. One end of a flexible connection or steel tape 76 is fixed to each pulley 75, as indicated at 77. This tape then extends forwardly and passes around a pulley 78 and then returns toward shaft 62 and has its end anchored to a support 79, as indicated at 80.

Figure 7:
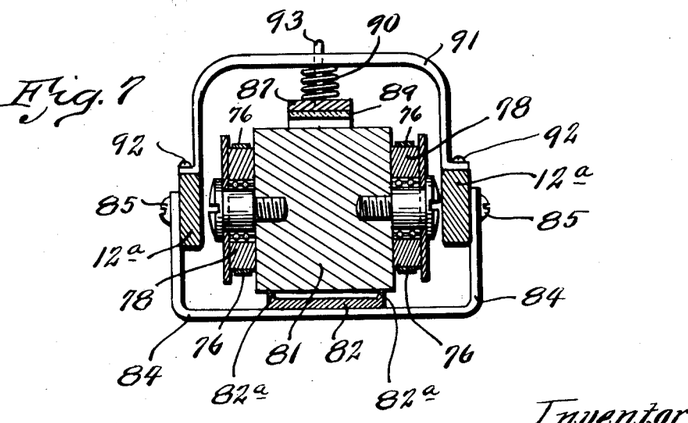
Figure 7 is a vertical cross section taken on line 7—7 of Figure 4.

Pulleys 78 are revolubly mounted on the ends of a cylindrical weight member or tare counterbalance 81. This cylindrical member is arranged coaxially with said pulleys 78 and is of considerably larger diameter, as indicated in Figures 4 and 7. This member is movably supported on a horizontally disposed track 82 which is preferably disposed below said members 12a and longitudinally thereof. One end of said track is fixed to and supported by a support 84 while the other end of said track is supported by the support 79. Both of these supports are substantially U-shape and have their vertical portions extending upwardly and secured to the side members 12a by suitable fastening means 85. As shown, the ends of these supports are preferably slotted where they engage said screws in order to provide for adjustment of said supports in vertical planes. Track 82 extends to each side of the fulcrum of the lever 12 and said supports 79 and 84 are spaced to each side of said fulcrum 14.

In order to reduce friction and resistance to the rolling action of member 81, track 82 is preferably formed with a pair of spaced longitudinally and upwardly disposed ribs or shoulders 82a which are of inverted V-shape in cross section (see Fig. 7). Furthermore, said tracks may be formed of glass or hardened steel. The tare counterbalance or member 81 rests on these ribs and is free to roll longitudinally of said track and relatively to the fulcrum 14 of lever 12. The ribs 82a offer very little friction and any dust which may settle on the track does not impede the movement of the weight 81. The track member 82 is detachably arranged in position on said supports 79 and 84 in any suitable manner, such as clips 86.

The cylindrical member or tare counterbalance 81 serves to counterbalance the tare or commodity container placed on platter 54 and is therefore movable in a substantially horizontal plane relatively to lever 12 and in accordance with the weight of the tare. Thus the greater the weight of the tare the greater is the depression of the tare lever 44 and accordingly member 81 is permitted travel of greater distance with respect to the fulcrum of lever 12. Thus the counterbalancing of the container of tare by weight 81 is automatic due to the rolling action of said cylindrical member on track member 82. The latter is inclined away from shaft 62 during this counterbalancing action and the extent of movement of member 81 away from shaft 62 is controlled by the length of tape 76 unwound by the revoluble movement of pulley 75.

The cylindrical member 81 is locked in moved or adjusted position by a bar 87 which is disposed above member 81. This locking bar is secured to lever 12 in such a manner that it can be raised out of contact with member 81 during the adjusting movement of the latter and forced downwardly into said frictional contact with the periphery of the side member 81 when it is desired to secure the latter in its adjusted position. The locking bar 87 is loosely secured at one end to a cross member 12c by a screw 88. Cross member 12c extends between and is formed integral with said members 12a. Said locking member is disposed above the fulcrum 14 of lever 12 and terminates adjacent to shaft 62, as clearly shown in Figure 5. The underside of this bar is lined with friction material, such as fabric 89, so as to insure a more efficient locking contact with member 81. Preferably a coiled spring 90 bears on top of bar 87 and serves to press said bar against member 81.

The upper end of said spring bears against the horizontal portion of an inverted U-shaped frame 91 which spans said side members 12a and has its ends secured thereto as indicated at 92. A pin 93 is secured to bar 87 and extends upwardly therefrom and has a slidable bearing in a hole formed in the horizontal portion of said frame, thereby forming a guide for said bar 87. An extension 95 is formed integral with the free end of bar 87 and extends laterally thereof, then downwardly adjacent to the outer side of one of the side members 12ª (see Figs. 8 and 9). An eccentric 96 or other suitable actuating means is operatively mounted on the respective side member 12ª and is engaged by said extension 95. A handle 97 is secured to said eccentric and is used manually to operate the latter in one direction to depress said bar 87 and render the counterbalance 81 stationary and said handle is operable in opposite direction to raise said bar 87 out of contact with said counterbalance 81 so that the latter is free to move on track member 82.

The tare counterbalancing or compensating member 81 rests freely on track 82 and operates between said members 12ª. Preferably it is so arranged that the axis of said tare compensating or rolling member is substantially in the same horizontal plane with the knife edge members or fulcrums 14 of the scale beam or main lever. Said rolling or compensating member preferably has no bearing or guiding engagement with said side members. In order to maintain said member 81 in properly aligned position and prevent twisting or distortion of flexible connections or tapes 78, a stop or aligning member 98 is provided. This member is fixed to support 79 and has an arcuate portion 98ª extending upwardly a suitable distance and disposed substantially equidistant from said members 12ª. This portion has its concave face formed of the same radius as the peripheral face of member 81 and the latter is adapted when brought to home or zero position to rest against said concave face. As this upward portion 98ª is of suitable width it serves to realign member 81 every time the latter is brought in contact therewith.

An adjustable stop 99 is fixed to the top wall of base 10 and is engageable by cross member 12ᶜ of lever 12 and limits the downward movement by the weight end of said lever, thereby preventing excessive or unnecessary movement thereof.

A dashpot 100 is fixed to base 10 and a piston arranged in said dashpot is carried by a piston rod 101 which is fixed to one of the side members 12ª as indicated at 102. This damping mechanism tends to dampen or check the movement of the scale and prevent injury to the knife edges or fulcrums thereof. A similar damping mechanism comprising a dashpot 104 and a piston carried by a piston rod 105 is used in conjunction with the tare lever 44. Piston 105 is fixed to tare lever 44, as indicated at 106, and dashpot 104 is carried by an arm 107 which is adjustably fixed to rod 59, as indicated at 108. Thus said dashpot 104 is mounted stationarily with respect to lever 44 and the piston operating in said dashpot and carried by piston rod 105 serves to prevent violent movement of tare lever 44.

When the scale is not in use, it occupies the position shown in Figure 3 with the scale lever 12 and track 82 disposed in horizontal planes and with the pointer 35 in alignment with the zero mark of the weight indicating chart 34. The tare compensating weight 81 occupies zero or home position shown in full lines in Figure 3 and in dotted lines in Figure 5 in which position it rests against the stop 98. The tare lever 44 and the platter 54 carried thereby occupy raised positions as shown in Figure 3.

Let us suppose that it is desired to use the scale to weigh a plurality of packaged commodities, such as lard, and that each package consists of twenty-five pounds of lard contained in a pail or container whose weight fluctuates between two and three pounds:

A weight of twenty-five pounds is placed on platter 28, thereby causing lever 12 to assume angular position with the tare end of said lever disposed above the weight end thereof and with the track member 82 occupying a correspondingly inclined position.

A tare or pail is then placed on platter 54. The weight of the pail causes tare lever 44 to be depressed accordingly. This displacement of said tare lever removes the tension on tape 70 and permits tare compensating weight 81 to roll downwardly over track 82 away from the stop 96. The distance which weight 81 is permitted to move is regulated by the flexion of tapes 86, one of the ends of which are secured to pulleys 75. As these pulleys are fixed to shaft 62, it is obvious that said shaft and pulleys will be actuated only a sufficient degree to take up the slack in tape 70. This slack in tape 70 has been produced by the depression or displacement of tare lever 44 and in accordance with the weight of the tare or pail placed on platter 54. Therefore, the movement of weight 81 relatively to the main lever 12 is controlled by the weight of the tare. This tare compensating member or weight 81 when thus moved changes its relative position to fulcrum 14 of said lever and thereby acts as a counterbalance to the weight of the tare so that the weighing condition of lever 12 is not affected by the weight of the tare. After member 81 moves to the right to compensate for the tare it is held against further movement, prompted by the load proper, by the tape connections 76 fixed to member 81 and to revoluble pulleys 75. The latter are mounted on shafts 62 and the revoluble movement of said shaft and of said pulleys is limited through the tape 71 and pulley 69 by the extent of downward movement of tare platform 54.

The pail is now filled with lard in the usual manner and when sufficient quantity has been placed in said pail, equivalent to the weight placed on platter 28, which, in the present instance, is twenty-five pounds, the pointer 35 moves to zero mark of chart 34, thereby indicating that the net weight of the commodity placed in the pail is equal to the weight placed on platter 28.

The filled pail is now removed from platter 54 thereby causing spring 46 to restore tare lever 44 to normal or raised position. In doing so, tape 70 is unwound, a corresponding distance from small pulley 69, thereby imparting to shaft 62 a revoluble motion, as indicated by solid line arrow in Figure 5. This actuation of shaft 62 causes tapes 76 to be wound on large pulley 75, thereby causing the weight or tare compensating member 81 to return to its home or zero position adjacent to stop 96, whereupon the scale is ready for the next weighing operation.

The greater the weight of the tare placed on platter 54, the greater is the depression of tare lever 44, thereby permitting greater rotary movement of pulleys 75 and the corresponding rolling movement or displacement of compensating weight 81. The weight of member 81 and its positioning relatively to the fulcrum 14 of lever 12 is arranged in proportion with the weight of the tare used in connection with the scale. The tension of spring 46 is such that when the weight of the tare is removed from the platter, said spring will cause the restoration of compensating member 81 and the movement of tare lever 44 and parts associated therewith to their home or zero positions.

The entire tare take-up mechanism 38 is carried by the lever 12 so that the weighing of the pail or commodity is not affected. Thus by actuating the locking means to cause bar 87 to engage member 81 and hold it stationary when in zero position (see Fig. 3) the scale can be used in the ordinary manner.

The provision of my tare take-up or compensating mechanism insures accurate weighing operation, eliminates wastage of material heretofore caused by overweight and prevents underweight. As it is not required to weigh the tare or container separately, considerable saving is effected both in time and labor. The operation of my tare take-up is automatic and therefore no special skill is required to operate it.

While I have shown and described the preferred form of my invention, it is obvious that various changes in the construction and arrangement of parts of my tare take-up mechanism can be made and substituted for those herein disclosed without departing from the spirit of my invention.

I claim:

1. An automatic tare compensating scale comprising a main scale lever, a tare lever carried by one end thereof, yielding means for maintaining said tare lever in one position and adapted to permit said tare lever to move in accordance with the weight of the tare placed on said scale, a track carried by said scale lever, a compensating member movably mounted on said track, and operative connections between said tare lever and said compensating member for limiting the compensating movement of the latter in accordance with the movement of said tare lever when the latter is moved from its normal position.

2. An automatic tare compensating scale comprising a main scale lever, a tare lever carried by one end thereof, yielding means for holding said tare lever in raised position and permitting downward movement thereof by and in accordance with the weight of the tare, a tare compensating member, a support carried by said main lever and supporting said compensating member whereby the latter is movable relatively to the fulcrum of said scale lever, and operative connections between said tare compensating member and said tare lever whereby said compensating member is moved in one direction in accordance with the weight of the tare and is restored to normal position upon the upward movement of said tare lever.

3. An automatic tare compensating scale comprising a main scale lever, a tare lever operatively mounted on one end thereof, means associated with said tare lever and with said main lever for holding said tare lever in raised position, said tare lever being movable downwardly by and in accordance with the weight of the tare placed thereon, a track fixed to said scale lever, a rolling member supported on said track and movable thereon relatively to the fulcrum of said lever, and operative connections between said rolling member and said tare lever whereby said rolling member is movable in one direction upon the downward movement of said tare lever to compensate for the weight of the tare and is moved in the opposite direction to zero position by said means when the tare is removed from said tare lever.

4. An automatic tare compensating scale comprising a main lever, a track carried thereby substantially parallel therewith, a tare lever operatively mounted on one end of said main lever, means for yieldingly maintaining said tare lever in one position, said tare lever being movable in opposite direction by and in accordance with the weight of the tare placed thereon, a tare compensating member movably arranged on said track, and means operatively connected to said tare lever and to said compensating member whereby the latter is movable on said track relatively to the fulcrum of said main lever in accordance with the displacement of said tare lever and is movable to normal position upon the restoration of said tare lever.

5. An automatic tare compensating scale comprising a main lever, a track carried thereby and substantially parallel therewith, a tare compensating member loosely arranged on said track, a tare lever operatively mounted on said main lever, operating connections between said tare compensating member and said tare lever, and means associated with said tare lever for yieldingly maintaining it and said tare compensating member in home position, said tare lever being displaceable by and in accordance with the weight of the tare, and said tare compensating member being movable on said track into compensating position accordingly, thereby counterbalancing said tare.

6. An automatic tare compensating scale comprising a main lever, a track carried thereby and disposed below the horizontal plane of the fulcrum thereof and substantially parallel therewith, a rolling member arranged on said track and movable thereon relatively to the fulcrum of said main lever, a tare lever operatively mounted on one end of said main lever, means associated with said tare lever for maintaining it in raised position, and operative connections between said tare lever and said rolling member whereby the latter is held in zero position when said tare lever occupies raised position, said tare lever being displaceable by and in accordance with the weight of the tare placed on said scale whereby said rolling member is caused to move on said track into tare compensating position in accordance with the weight of said tare.

7. An automatic tare compensating scale comprising a main lever, a track carried thereby and disposed below the horizontal plane of the fulcrum thereof, a rolling member supported on said track and movable relatively to the fulcrum of said main lever, a tare lever operatively supported by one end of said main lever, a commodity platter carried by said tare lever, a spring connected to said tare lever for yieldingly maintaining it and said commodity platter in raised position and yieldable when a tare is placed on said platter so as to permit displacement of said tare lever by and in accordance with the weight of said tare, and flexible operative connections between said tare lever and said rolling member whereby the latter is caused to move into tare counterbalancing position in accordance with the displacement of said tare lever and is caused to move to zero position upon the restoration of said tare lever.

8. An automatic tare compensating scale comprising a main lever, a track carried thereby, a rolling member supported on said track and movable relatively to the fulcrum of said main lever, a tare support operatively mounted on one end of said main lever, a commodity platter carried by said tare support, a spring connected to said tare support for yieldingly maintaining it and said commodity platter in raised position and yieldable when a tare is placed on said platter so as to permit displacement of said tare support in accordance with the weight of said tare, flexible operative connections between said tare support and said rolling member whereby the latter is caused to move into tare counterbalancing position in accordance with the displacement thereof and is caused to move to zero position upon the restoration of said tare support, and means for locking said tare compensating member immovable.

9. In a scale, the combination with a scale lever, of a tare lever operatively carried by said scale lever, a track carried by said scale lever in a horizontal plane substantially parallel therewith, a tare compensating member movably supported on said track, means operatively connecting said compensating member with said tare lever whereby said tare lever is adapted to be displaced in accordance with the weight of the tare placed on said scale, and said tare compensating member being movable on said track relatively to the fulcrum of said scale lever in accordance with the displacement of said tare lever, thereby counterbalancing the weight of said tare, and yielding means for restoring said tare lever to normal position.

10. In a scale, the combination with a scale lever, of a tare lever operatively carried by said scale lever, a spring connected to said tare lever for yieldably maintaining it in raised position, said tare lever being movable downwardly in accordance with the weight of the tare, a track fixed to said scale lever and extending to both sides of the fulcrum thereof, a tare compensating member resting on said track and movable thereon relatively to the fulcrum of said scale lever, and flexible operating connections between said tare lever and said compensating member whereby the latter is movable into tare compensating position in accordance with the downward movement of said tare lever and is moved to zero position upon the restoration thereof.

11. In a scale, the combination with a scale beam, of a tare lever operatively mounted thereon, means associated with said scale beam and said tare lever for maintaining the latter in raised position, and a tare compensating means carried by said scale beam and operatively connected to said tare lever whereby said compensating means is movable relatively to the fulcrum of said scale beam in accordance with the displacement of said tare lever to compensate for the weight of the tare placed on said tare lever, said compensating means being restored to normal position upon the upward movement of said tare lever.

12. In a weighing scale, the combination with a main lever, of a tare lever carried thereby and movable in a vertical plane by and in accordance with the weight of the tare, yielding means for restoring said tare lever to normal position, a tare compensating member movably carried by said main lever, and operative connections between said tare lever and said compensating lever whereby the latter is movable in a horizontal plane relatively to the fulcrum of said main lever in correlation with the movement of said tare lever and in accordance with the weight of said tare.

13. In a weighing mechanism, the combination with a main lever, of a tare lever carried thereby and movable in a vertical plane in accordance with the weight of a tare, means for yieldably maintaining said lever in zero position, a tare compensating member carried by said main lever and movable longitudinally thereof, and means operatively connecting said tare lever with said tare compensating member whereby the extent of compensating movement of said compensating member is controlled by the extent of movement of said tare lever.

14. In a weighing mechanism of the class described, the combination with a main scale lever, of a tare lever carried thereby and movable in a vertical plane in accordance with the weight of the tare, a tare compensating member carried by said main lever and movable longitudinally thereof, means operatively connecting said compensating member with said tare lever whereby its movement is in direct ratio with the movement of said tare lever, and yielding means for restoring said tare lever and said compensating member to their home positions when said tare lever is relieved of the weight of said tare.

15. In a weighing scale, the combination with a main lever, of a tare lever operatively carried thereby, a commodity platter supported by said tare lever and adapted to receive the tare, said tare lever being adapted to be displaced in accordance with the weight of said tare, means associated with said tare lever for yieldably resisting the displacement thereof and restoring it to zero position when said tare is removed, a tare compensating member movable automatically in one direction relatively to the fulcrum of said main lever in accordance with the displacement of said tare lever to counterbalance said tare, and a flexible connection between said tare lever and said compensating member for restoring the latter to zero position upon the restoration of said tare lever.

16. In a weighing scale, the combination with a main lever, of a tare lever operatively carried thereby, a commodity platter supported by said tare lever and adapted to receive the tare, said tare lever being adapted to be displaced in accordance with the weight of said tare, a tare compensating member movable automatically in one direction relatively to the fulcrum of said main lever in accordance with the displacement of said tare lever, thereby counterbalancing the weight of said tare, a flexible connection between said tare lever and said compensating member for restoring the latter and a spring connected to said tare lever for yieldingly resisting the displacement thereof and adapted to restore said tare lever and said tare compensating member to home position when said tare is removed.

17. In a weighing scale, the combination with a main lever, of a tare lever carried thereby and movable in a vertical plane in accordance with the weight of a tare, a spring connected to said tare lever for yieldably maintaining it in normal position, a tare compensating member carried by said main lever and movable in a horizontal plane to compensate for said tare, and means operatively connecting said tare lever with said tare compensating member so as to regulate the extent of the movement of said compensating member in accordance with the extent of movement of said tare lever.

18. In a weighing scale, the combination with a main lever, of a tare lever operatively carried thereby and movable in a vertical plane in accordance with a tare placed on said tare lever, yielding means for restoring said tare lever to normal position, a tare compensating member carried by said main lever and movable in a horizontal plane relatively thereto, and means operatively connecting said tare lever with said tare compensating member whereby the latter is moved to counterbalance the tare in accordance with the weight thereof, said means including a revoluble member and operable by said tare lever, and flexible connections between said revoluble member and said tare compensating member.

19. In a tare compensating weighing scale, a main lever, a tare lever carried thereby and displaceable in accordance with the weight of a tare, yielding means for restoring said tare lever to normal position, a tare compensating weight carried by said main lever and movable relatively to the fulcrum thereof, and means operable by said tare lever and associated with said compensating weight so as to control the compensating movement thereof in accordance with the displacement of said tare lever.

20. In a tare compensating weighing scale, a main lever, a tare lever operatively carried thereby and movable in a vertical plane in accordance with the weight of a tare, a spring for restoring said tare lever to normal position, a tare compensating weight carried by said main lever and movable in a horizontal plane with respect to the fulcrum thereof, and means for translating the vertical movement of said tare lever into horizontal movement of said tare compensating member whereby the weight of the tare is compensated by the movement of said compensating member.

21. In a tare compensating weighing scale, a main lever, a track carried by said lever, a tare compensating weight member movably mounted on said track, a tare lever operatively mounted on said main lever and operable relatively thereto by and in accordance with the weight of the tare, a spring for restoring said tare lever to normal position, and operative connections between said tare lever and said tare compensating member whereby the extent of compensating movement of the latter is controlled by the operating movement of said tare lever.

22. In a tare compensating weighing scale, a main lever, a track carried thereby, a tare compensating member movably mounted on said track, a load receiving means mounted on said main lever and including a tare lever operable by and in accordance with the weight of the tare, yielding means for restoring said tare lever to normal position, and operative connections between said tare lever and said compensating member whereby the latter is actuated relatively to said main lever in direct ratio with the actuation of said tare lever.

23. In a tare compensating weighing scale, a main lever, a tare lever fulcrumed on said main lever and movable relatively thereto by and in accordance with the weight of the tare placed on said scale, a resilient member connected to said tare lever for normally maintaining it in zero position and yieldable under the weight of the tare, a tare compensating member carried by said main lever and movable relatively to the fulcrum thereof, and operating connections between said tare lever and said compensating member for controlling the compensating movement of the latter by said tare lever in accordance with the weight of the tare.

24. In a tare compensating weighing scale, the combination of a main lever, a load receiving means carried by said main lever and including a tare lever movable by and in accordance with the weight of the tare placed on said means, means for restoring said tare lever to normal position when said tare is removed, a track carried by said main lever and movable therewith, a tare compensating weight member movably mounted on said track and movable thereon relatively to the fulcrum of said main lever, and operating connections between said tare lever and said tare compensating member whereby the latter is moved into compensating position in conjunction with the operation of said tare lever and in accordance with the weight of the tare and is restored to zero position upon the restoration of said tare lever.

25. In a tare compensating weighing scale, the combination of a main lever, a load receiving means carried by said main lever and including a tare lever movable by and in accordance with the weight of the tare placed on said means, means for restoring said tare lever to normal position when said tare is removed, a track carried by said main lever and movable therewith, a tare compensating weight member movably mounted on said track and movable thereon relatively to the fulcrum of said main lever, operating connections between said tare lever and said tare compensating member whereby the latter is moved into compensating position in conjunction with the operation of said tare lever and in accordance with the weight of the tare and is restored to zero position upon the restoration of said tare lever, and manually operable means for engaging said tare compensating member and locking it in moved position.

26. In a tare compensating weighing scale, a main lever, a hanger mounted on said lever, a tare lever fulcrumed on said hanger and adapted to support a load platform and operable relatively to said main lever in accordance with the weight of the tare placed on said platform, a spring for restoring said tare lever to normal position, a track carried by said main lever, a tare compensating member freely mounted on said track and movable thereon relatively to the fulcrum of said main lever, and operating connections between said tare lever and said tare compensating member whereby the latter is actuated by said tare lever in accordance with the weight of the tare and is restored to zero position upon the restoration of said tare lever.

27. In a tare compensating weighing scale, the combination with a scale beam, of a load receiving means carried thereby and including a tare lever pivotally mounted at one end, a load receiving platform carried by the other end of said tare lever, means connected to said tare lever for maintaining it and said platform in raised position and yieldable to permit displacement of said tare lever in accordance with the weight of the tare, a tare compensating weight carried by said beam and movable relatively to the fulcrum thereof, and operative connections between said tare lever and said compensating weight for moving the latter in accordance with the movement of said tare lever.

28. In a tare compensating weighing scale, the combination with a main scale lever, of a load receiving means carried thereby and including a hanger pivotally mounted on said scale lever, a tare lever pivotally carried by said hanger and extending thereabove, a load receiving platter pivotally mounted on the other end of said tare lever, a check link means connecting said hanger with said platter for maintaining the latter in proper position, a coiled spring connected to said hanger and to said tare lever for maintaining the latter and said platter in raised position and yieldable to permit displacement of said tare lever by and in accordance with the weight of the tare placed on said platform, a tare compensating member carried by said scale lever and movable relatively to the fulcrum of said lever and means operatively connecting said tare lever with said compensating member whereby the latter is movable into compensating position upon the displacement of said tare lever in ratio with the weight of the tare and is movable to normal position by said coiled spring upon the restoration of said tare lever to normal position.

29. In a tare compensating weighing scale, the combination with a main lever, of a tare compensating weight mounted thereon and movable relatively to the fulcrum thereof, a load platter support carried by said main lever and including a member operable by and in accordance with the weight of a tare placed on said platter, means connected to said member and to said tare compensating weight whereby the compensating movement of the latter is controlled by said movable member in accordance with the weight of the tare, and means for restoring said load platter support and said compensating weight to normal positions.

30. In a weighing scale, the combination with a main scale lever, of a tare compensating weight carried thereby and movable relatively to the fulcrum thereof, and a load receiving means carried by said main lever and including a member displaceable by and in accordance with the weight of the tare, a spring yieldably opposing the displacement of said member, and operating connections between said displaceable member and said tare compensating weight whereby the compensating movement of the latter is controlled by the extent of displacement of said displaceable member and is restored to zero position by said spring in conjunction with said displaceable member.

31. In a tare compensating weighing scale, a main lever, a tare receiving member carried thereby and displaceable in accordance with the weight of the tare, means for restoring said tare receiving member to normal position when the tare is removed therefrom, a tare compensating member carried by said main lever and movable relatively to the fulcrum thereof, and operative connections between said compensating member and said tare receiving member whereby said tare compensating member is moved from its normal position in accordance with the weight of said tare.

32. In a tare compensating weighing scale, a main lever, a tare actuated lever fulcrumed on said main lever and operable in accordance with the weight of the tare, means for yieldably restoring the movement of said tare actuated lever, a tare compensating member carried by said main lever and movable relatively to the fulcrum thereof, and means operatively connecting said tare compensating member with said tare actuated lever whereby said tare compensating member is moved from its normal position in accordance with the weight of said tare.

33. In a tare compensating weighing scale, the combination of a main lever, a load receiving member carried thereby and operable relatively thereto in accordance with the weight of a tare placed thereon, yielding means for maintaining said receiving member in normal position and a tare compensating weight member carried by said main lever, and operative connections between said load receiving member and said tare compensating member whereby the latter is movable relatively to said main lever in accordance with the weight of the tare placed on said load receiving member thereby compensating for the weight of said tare and preserving the balanced condition of said main lever.

34. In a tare compensating weighing scale, the combination with a main lever, of a tare compensating member movably mounted on said lever, a tare receiving means mounted on said main lever and displaceable by the weight of the tare applied thereto, yielding means for resisting the displacement of said receiving means, and an operating connection between said receiving means and said tare compensating member whereby the latter is movable upon the displacement of said receiving means relatively to the fulcrum of said main lever to counterbalance the weight of said tare.

35. In a weighing scale, a tare compensating means comprising in combination with a scale beam, of a tare compensating member carried by said beam and movable relatively to the fulcrum thereof, a tare support movably mounted on said scale beam, yielding means for maintaining said tare support in normal position, the latter being movable by and in accordance with the weight of the tare applied thereto, and a flexible connection between said tare support and said compensating member whereby the movement of the latter is controlled by the movement of said tare support and said compensating member is returned to normal position upon the restoration of said tare support.

ARTHUR E. MICHENER.